Nov. 22, 1960  F. BROUWER  2,961,585
ELECTROMECHANICAL TRANSDUCER AND SYSTEM
Filed Dec. 14, 1956  2 Sheets-Sheet 1

United States Patent Office 2,961,585
Patented Nov. 22, 1960

2,961,585

ELECTROMECHANICAL TRANSDUCER AND SYSTEM

Frans Brouwer, Ancaster, Ontario, Canada, assignor, by mesne assignments, to Westinghouse Electric Corporation, a corporation of Pennsylvania Filed Dec. 14, 1956, Ser. No. 628,285

Claims priority, application Canada Dec. 15, 1955

11 Claims. (Cl. 318—28)

My invention relates to transducers for converting mechanical position or motion to electrical quantities.

Numerous methods have been suggested in the past for measuring mechanical position in terms of electrical quantities. For example, differential transformers which vary the intercoupling between two coils in response to a mechanical movement of a portion of the transformer core have been used for strain gauges and other displacement measuring devices. The linearity of such devices, however, is usually limited to a very slight mechanical displacement. To overcome this limitation, it would be possible to use a plurality of units closely adjacent having a repetitive form. This permits the accuracy and linearity of a slight mechanical movement together with the freedom of a long mechanical motion when this is required. However, the duplication of elements with a suitable degree of accuracy is both difficult and expensive.

It is an object of this invention to provide a mechanical electrical transducer of improved accuracy and linearity but which permits appreciable mechanical movement.

It is a further object of this invention to provide a mechanical electrical transducer of repetitive form of simple and economical construction.

It is a further object of this invention to provide an electromechanical positioning or measuring system of high accuracy and simple construction.

These and other objects, as will be apparent from the following, are attained by arranging the field producing elements of the transducer in the form of a helix and similarly forming the field sensing elements. In this way a plurality of closely adjacent sensing areas are in essense produced in repetitive form which permits large movements of the sensing elements and yet retains the required sensitivity and linearity.

A clearer understanding of this invention may be had from a consideration of the following specification and drawings, in which:

Figs. 1(a) and 1(b) are diagrammatic representations of complex forms of mechanical electrical transducers which permit appreciable mechanical movement;

Figure 1A:
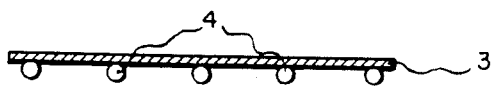

Considering first Fig. 1(a), there is shown in section a series of conductors mounted on an insulating backing designated 2. A further series of conductors 4 is mounted on a support 3. Using the conventional marking, the first series of conductors have current flowing in the directions indicated by the marks on the section. With the second or pickup series of conductors 4, in the position shown, there will be no mutual coupling between the pickup conductors and the current carrying conductors. When the pickup series of conductors is moved sideways, however, a mutual coupling will exist between the pickup conductors and the current carrying conductors. By connecting all the current carrying conductors and all the pickup conductors in separate series circuits and supplying to the current carrying conductors an alternating current, there will be induced in the pickup conductors 4 a current dependent upon the relative position of the current carrying conductors and the pickup conductors. The current induced in the pickup conductors will reach a maximum when the conductors are directly opposite the current carrying conductors. As the pickup conductors are moved sideways, the induced current will decrease reaching a minimum, or null, in the position shown and proceeding to a second maximum of opposite phase when they once again are directly opposite the current carrying conductors. The motion of the pickup may be continued producing a series of nulls and maximae. The coarse position may be determined by the number of maximae through which the pickup has passed while the fine position may be determined by the current in the pickup coil.

While such a form of transducer may be constructed, it will be evident that the accuracy of measurament depends upon the accuracy of the arrangement of various conductors. Such arrangements of conductors may be made by the printed circuit technique but great precision is required. Further, the accuracy of the fine positioning depends on the linearity of the pickup response. While such response is a measurable function of position, it may vary from point to point on the transducer if there is any error in the conductor arrangement.

Figure 1B:
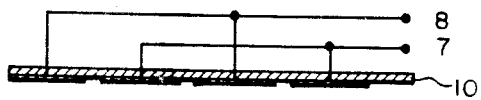
Figure 1B:

In Fig. 1(b) is shown a comparable capacitive arrangement. Here a series of plates are mounted on two insulating members 9 and 10. As the pickup plates mounted on insulating member 10 are moved to the right, the capacity from terminal 6 to terminal 7 increases and the capacity from terminal 5 to terminal 7 decreases. Similarly, the capacity from terminal 5 to terminal 8 increases and the capacity from terminal 6 to terminal 8 decreases. If a source of alternating potential is applied to terminals 5 and 6, a potential will appear on terminals 7 and 8. The potential on 7 and 8 will reach a maximum when the plates are directly in line and will be at a minimum, or null, in the position shown. Further motion will produce a maximum in the reverse phase. The potential output on terminals 7 and 8 corresponds to the current output from the pickup conductors of Fig. 1(a). This device may also be built by the printed circuit technique but it also has the inherent problems of the device of Fig. 1(a), its accuracy depending on the accuracy of reproduction of a series of conductive areas.

It will be understood, of course, that Figs. 1(a) and 1(b) are purely schematic and that the number of plates connected to terminals 5 and 6 or the number of current carrying conductors may be increased to suit the particular situation.

Figure 2:
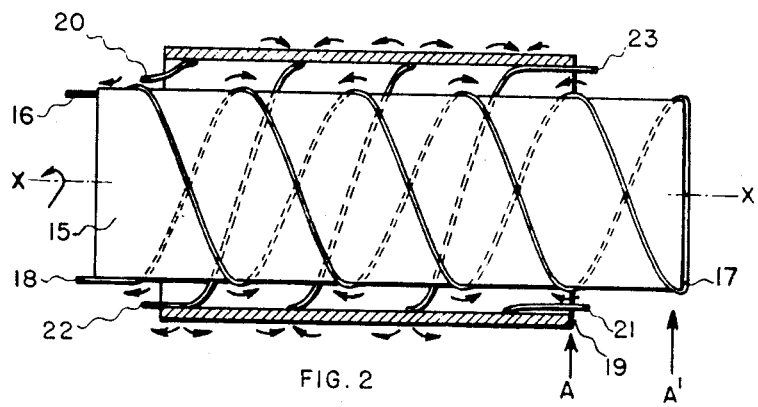
Fig. 2 is a schematic representation of one embodiment of this invention.

Fig. 2 shows a much more convenient construction for a device functioning in the manner described with relation to Fig. 1(a). In this figure, all the current carrying conductors are formed as a helix around a support member 15. Starting from terminal 16 there is a forward helix ending at the end of the support member 15 at point 17. From this point, there is a reverse helix returning to terminal 18. A section of these two helices taken on one side of the axis would appear identical to the section of the current carrying conductors in Fig.

1(a). The pickup conductors consist of two helices mounted in an insulating tubular member 19. One helix commences at terminal 20 and terminates at terminal 21. The other commences at terminal 22 and ends at terminal 23. The pickup element consisting of the tubular member and the two helices is shown in section.

If an alternating current is applied to terminals 16 and 18, a corresponding potential will be developed across terminals 20 and 21, depending upon the relative position of the pickup coil and the current carrying conductors as described in relation to Fig. 1(a). A similar potential will appear across terminals 22 and 23. By properly connecting these two coils in series, as by connecting terminal 21 to terminal 23, or using either coil independently, the potential developed can be utilized to determine the position of the pickup element relative to the current carrying conductors. Let the assumption be that the pickup element is moved so that point A coincides with point A'. In so doing, the potential developed across the pickup coil varies from a minimum through a maximum and back to a minimum.

Now let the assumption be that the pickup coil is not moved but rather that the current carrying coil is rotated about its axis $x-x$. The effect of a rotation of 180° will exactly correspond to a movement of the pickup coil from A to A'. If the pitch of the helices of the current carrying coils is known, then a shaft carrying support member 15 may be calibrated in linear measurements rather than degrees and point A will have a specific linear position relative to the current carrying coil when the pickup output is null. There will, of course, be an ambiguity due to the repetitive nulls but this can be eliminated with a coarse measuring element which provides an approximate positioning of the pickup.

Figure 4:
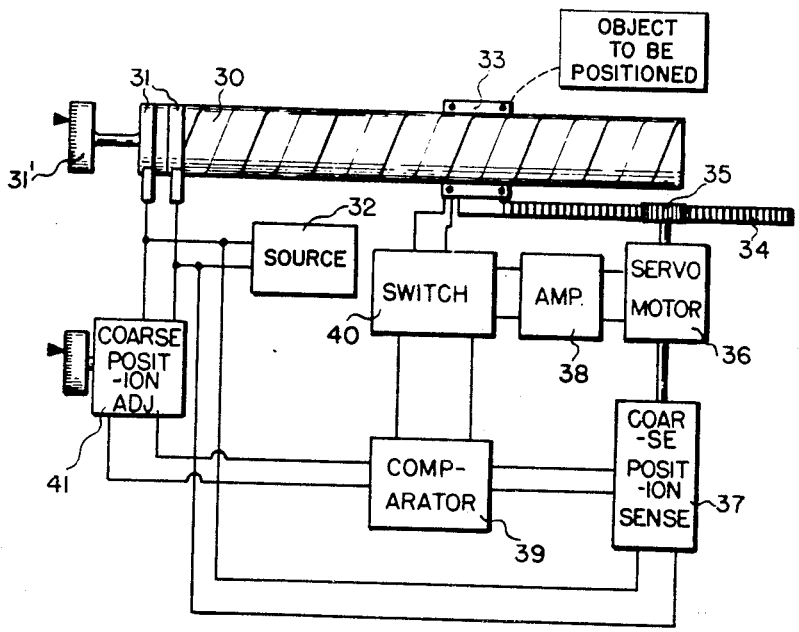
Fig. 4 is a schematic representation of a positioning system utilizing a transducer according to this invention.

In Fig. 4 is shown a positioning system utilizing a transducer according to this invention. The current carrying coils of the transducer and their support member are designated 30. This portion 30 is fixed in its axial direction but free to move about its axis. To this end, the alternating current to the coils is applied through slip rings 31 from source 32 and a dial 31' fixed to portion 30 is calibrated in linear measurement. The pickup coil 33 is relatively short; usually the pickup coil 33 is many times shorter than coil as shown. The pickup coil 33 is mounted on a cross feed, for example a rack 34 driven by pinion 35. The pinion 35 is on the shaft of a servo motor 36. Also coupled to the servo motor 36 is a coarse position sensing device 37. The control voltage for servo motor 36 is derived from amplifier 38 whose input may be from comparator 39 or pickup 33 according to the condition of switch 40. The input to comparator 39 is from coarse position sensing device 37 and coarse position adjusting device 41.

Figure 5:
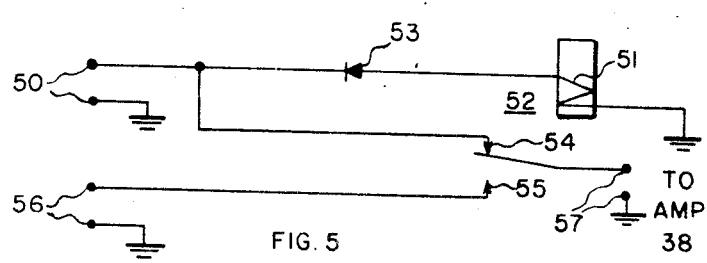
Fig. 5 is a schematic diagram of a circuit useful in the system of Fig. 4.

In operation, the position of the pickup is determined by setting the coarse and fine controls. The coarse control establishes the position of the pickup as a fixed number of maximae produced by coil 33 in its movement from one end of rod 30 to the other. This coarse control may be any simple form of servo mechanism which produces an error signal when the position of the pickup does not correspond with the setting of the coarse adjustment. This error signal is produced in comparator 39 by comparing the output of the coarse adjusting control 41 to the output of the coarse position sensing device 37. The error voltage so produced is fed through switch 40 and amplifier 38 to servo motor 36 causing the motor to rotate in a direction to correct the position of the pickup. As the pickup approaches the correct position, the error voltage decreases. When the error voltage is less than a certain value, switch 40 automatically changes its condition and the signal from pickup 33 is applied to the amplifier 38 rather than the signal from comparator 39. A suitable circuit arrangement for switch 40 is shown in Fig. 5. The output from comparator 39 is applied to terminals 50 and applied to field 51 of relay 52 through rectifier 53. The upper contact 54 of relay 52 is also connected to one of the terminals 50 while the lower contact 55 is connected to one of the terminals 56 to which is applied the output from the sensing element 33. The moving contact of the relay is connected to terminals 57 which as indicated lead to amplifier 38. When the signal from comparator 39 exceeds a certain value, the moving contact of the relay connects terminals 50 to terminals 57. The contact is, however, biased in a downward direction and as soon as the signal from terminals 50 falls below a certain value, the relay drops out and connects terminals 56 to terminals 57.

The signal from the pickup coil 33 depends upon the position of pickup 33 in relation to the coils of device 30. As was previously explained, the axial positions which produce nulls are dependent upon the rotational position of device 30. The fine position may, therefore, be established by the setting of the fine position control. The servo mechanism including pickup 33, amplifier 38 and servo motor 36 tends to cause the pickup coil to centre on a null. The accuracy of the alignment of the pickup coil with a minimum, or null, of course, depends upon the precision of the construction of the transducer but as the pickup coil covers more than one complete turn of the current carrying coils, errors in either the current carrying or pickup coil tend to average out. As the instrument operates on a null the accuracy is not affected by frequency or phase changes in the supply current. It will be found that conventional winding techniques using normal wire sizes will provide extraordinary accuracy. For example, a pickup coil having an axial length of two inches wound with .012 inch diameter wire co-operating with a current carrying coil consisting of a bifiliar winding of .012 inch diameter wire on a 1.0 inch diameter rod produced usable error voltages for variations of .000010 inch.

Greater accuracy of the windings may be obtained by cutting grooves in the rod 15 and winding the wire in the groove.

Figure 3:
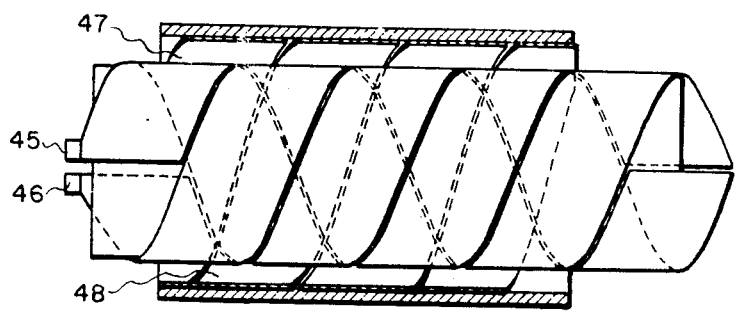
Fig. 3 is a schematic representation of a further embodiment of this invention.

A further variation of the transducer is shown in Fig. 3 which is the capacitive form of this invention. It corresponds to the form shown in Fig. 1(b) and it functions in the manner as described with relation to this figure. An alternating potential is applied to terminals 45 and 46 and the potential across 47 and 48 is measured. This form of transducer may be directly substituted in Fig. 4 for the transducer as shown in Fig. 2. Repetitive minimum and maximum points will occur at regular intervals as the pickup element is moved axially.

The capacitive form may be produced by various methods such as plating or etching but the accuracy may be conveniently obtained by machining off the non-conducting areas from a completely coated rod and tube.

Figure 6:
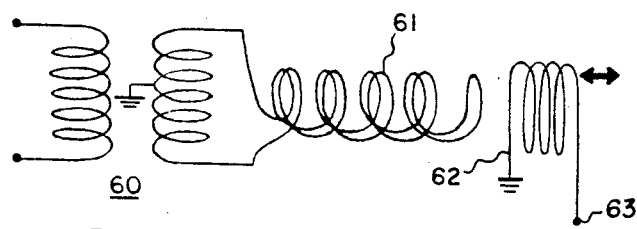
Fig. 6 is a schematic diagram of a modified form of transducer and a portion of its associated circuit.

While thus far all forms of the transducer described have used bifiliar windings for both the current carrying coil and the pickup coil, these are not to be considered restrictive. For example, in Fig. 6 there is shown a circuit using a transducer according to this invention in which only one coil is bifiliar. An alternating current is applied to the primary of transformer 60. The secondary of this transformer is connected by a centre tap to ground and supplies current to a bifiliar winding 61. A helical pickup coil 62 surrounds coil 61 and has one end connected to ground. The opposite end of coil 62 supplies a sense signal to terminal 63. The operation of this device is the same as the operation as described for previous forms and it will be understood that either the pickup coil or the current coil may be bifiliar. It is only necessary that one of the coils be so wound. A similar modification may be made to the capacitive form of the device. The form using two bifiliar windings is, however, generally to be preferred since in this form neither coil is influenced by external fields.

Figure 7:
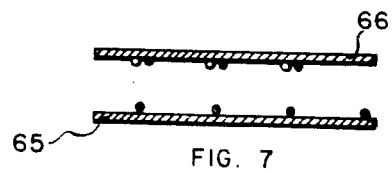
Fig. 7 is a schematic representation of a portion of a modified form of transducer according to this invention.

Fig. 7 shows a further possible modification for cases where it is desired that the null be more sharply defined. Only a small section of one side of the current carrying coil and the pickup coil is shown. On a support 65, there is arranged a monofilar current carrying coil, and on the support 66, there is arranged a bifilar pick-up coil. Both helices of the coil having the same constant lead and the same lead as the coil on support 65, with the pitch varying alternatively between two values. For the best effect, the lead of the coils must be relatively large, say more than one tenth of an inch. As a result, as the closely adjacent pickup wires pass over a current carrying wire, there is a rapid increase in signal, a rapid reversal and a rapid decrease in signal. Every alternate null is, therefore, very well defined. This form not having a sinusoidal signal response is not as useful when it is desired to interpolate between null points but would have valuable qualties when used in the circuit of Fig. 4. Other similar modifications could be used to produce desired response characteristics in the capacitive form.

It will be understood that the invention is capable of various adaptations and that various changes and modifications may be made or substitutions resorted to which come within the spirit of the invention as herein set forth.

The claims:

1. An electromechanical positioning system for positioning an object including a first pair of helical conductors having the same pitch, radius, axis and axial length with respect to their helical form, both conductors having independent terminals at one extremity but having a common terminal at their opposite extremity, a conductive element in inductive relationship to said helical conductors and comprising at least one other helical conductor having the same pitch and axis as said first helical conductors and a slightly different radius, means connected to said independent terminal for applying an alternating potential to said terminals, means to derive the alternating potential induced by said applied potential from said conductive element, said first helical conductors being fixed relative to a reference point and said conductive element being fixed relative to said object, a servomotor connected to said conductive element to move said element, means connected to said servomotor to move said element translationally to position said object approximately, means connected to said first pair of conductors to precisely position said object by rotating said first pair relative to said element, and means connected to said servomotor and to said element for moving said element so as to reduce said derived potential to zero.

2. An electromechanical measuring system comprising a first pair of helical conductors having the same pitch, radius, axis and axial length with respect to their helical form, both conductors having independent terminals at one extremity but having a common terminal at their opposite extremity, a conductive element in inductive relationship to said conductors and comprising at least one other helical conductor having the same pitch and axis as said first helical conductors and a slightly different radius, means connected to said independent terminals to apply an alternating potential to said terminals, means connected to said element for deriving from said conductive element the alternating potential induced in said element by said applied potential, said first helical conductors being translationally fixed relative to a reference point but being rotatable, and said conductive element being translationally movable to the position of the distance to be measured, means connected to said element to indicate a null alternating potential from said conductive element, and means to translate the relative positions both translationally and angularly of the first helical conductors and the conductive element into a measure of the distance to be measured at such a null.

3. An electromechanical transducer comprising a first pair of helical conductors having the same pitch, radius, axis and axial length with respect to their helical form, both conductors having independent terminals at one extremity for energization from a suitable supply of alternating-current electrical energy, but having a common terminal at their opposite extremity, a support for said helical conductors, said helical conductors being rigidly mounted on said support against movement in the axial direction but adjustably mounted for rotation about their axis, a conductive element comprising at least one other helical conductor having the same pitch and axis as said first helical conductors but a somewhat different radius to fit in close proximity to said first pair of helical conductors, said element being movable in an axial direction relative to said first pair, and means connected to said conductive element to derive from said conductive element an alternating potential.

4. An electromechanical transducer comprising a first pair of helical conductors having the same pitch, radius, axis and axial length with respect to their helical form, both conductors having independent terminals at one extremity for energization from a suitable supply of alternating-current electrical energy, but having a common terminal at their opposite extremity, a support for said helical conductors, said helical conductors being rigidly mounted on said support against movement in the axial direction but adjustably mounted for rotation about their axis, a conductive element comprising at least one pair of helical conductors having the same pitch and axis as said first helical conductors but a different radius to fit in close proximity to said first pair of helical conductors, and means connected to said conductive element to derive an alternating potential from said conductive element, said conductive element being rigidly mounted on said support against circumferential movement about its axis but being mounted for movement on the support in the axial direction.

5. An electromechanical transducer comprising a first element consisting of a pair of separate adjacent coaxial helical conductive members, said members being generally parallel throughout the majority of their length, the spacing between the conductive members of said pair being substantially smaller than the turn pitch of the helix into which said element is formed, at least one other helical conductive element having the same axis and pitch as said conductive members but of different radius and axially movable relative thereto, means to supply electrical energy to one of said elements, and means to derive electrical energy from the remaining element.

6. An electromechanical transducer comprising a first pair of helical conductors having the same lead, radius, axis and axial length with respect to their helical form, both conductors having independent terminals at one extremity for energization from a suitable supply of alternating-current electrical energy, but having a common terminal at their opposite extremity, a support on which said helical conductors are rigidly mounted said support being mounted for rotation to rotate said helical conductors about their axis but rigidly restrained against motion in an axial direction, a conductive element comprising at least one other helical conductor having the same lead and axis as said first helical conductor but a somewhat different radius to fit in close proximity about said first pair of helical conductors, said element being mounted on a support free to move in an axial direction but restrained from rotational motion about the axis of the helical conductors, and means connected to said element to derive an alternating potential from said conductive element.

7. An electromechanical transducer comprising a first conductive element including a pair of helical conductors having the same lead, radius, axis and axial length with respect to their helical form, arranged with the spacing between alternate adjacent turns regularly varying between two values, a support on which said helical conductors are rigidly mounted, a second conductive element comprising at least one other helical conductor having the same lead and axis as said first helical conductors but a somewhat different radius to fit in close inductive proximity to said first pair of helical conductors and mounted on a support, means connected to one of said elements for supplying alternating current to said element, and means connected to the other of said elements for deriving from said other element alternating current induced by said supplied alternating current.

8. An electromechanical transducer comprising a first pair of helical conductors having the same lead, radius and axial length with respect to their helical form, a terminal connection to each of said conductors, a support on which said helical conductors are mounted said support being mounted for rotation to rotate said helical conductors about their axis but rigidly restrained against motion in an axial direction, a conductive element comprising at least one other helical conductor having the same lead and axis as said first helical conductors but a somewhat different radius to fit in close proximity to said first pair of helical conductors and mounted on a support free to move in an axial direction but restrained from rotational motion about the axis of the helical conductors, means to apply an alternating potential to each of said terminal connections and means to derive at least one alternating potential from said conductive element relative to said terminal connections.

9. An electromechanical positioning system including a base and an element to be positioned relative to said frame and a transducer comprising a first element consisting of a pair of separate contiguous coaxial helical conductive members having a common terminal at one end and separate terminals at their other end and being generally parallel throughout the majority of their length a support for said conductive elements mounted on said frame for rotation about the axis of the elements but restrained from motion in the axial direction, at least one other helical conductive element having the same axis and lead as said conductive members but of different radius and mounted on a further support for movement in an axial direction but restrained from motion about the axis of the elements, a servomotor connected to said further support and the element to be positioned to move them in an axial direction, means connected to said separate terminals to supply alternating electrical energy to said separate terminals, means connected to said conductive element to derive alternating electrical energy from said conductive element, and means to apply the derived energy to said servomotor in such a manner as to cause the servomotor to move said further support in a direction to cause the derived energy to be reduced to a minimum.

10. An electromechanical transducer comprising, a base, a first bifilar winding in the form of a double helix of conductive wire, said helix being of uniform pitch throughout the length of the helix, a second bifilar winding in the form of a double helix of conductive wire, said second named helix being of uniform pitch throughout the length of said second helix, the pitch of said helixes being the same, said helical windings being coaxial and relatively closely spaced from each other, means connecting one of said double helixes at the end thereof, means connected to one of said helixes for axially displacing said one helix with respect to said other helix, and means connected to said other helix for rotating said other helix, about the common axes of said helixes, with respect to the one helix.

11. An electromechanical transducer comprising, a bifilar winding in the form of a first double helix of conductive wire connected together at one end thereof, said helix being of uniform pitch throughout the length of the helix, a second bifilar winding in the form of a double helix of conductive wire substantially shorter than said first helix, said second helix being of uniform pitch throughout the length thereof, the pitch of said helixes being the same, said helical windings being coaxial and spaced from each other a short distance so that they are in inductive relationship, said second helix being mounted for axial movement with respect to said first helix and said first helix being mounted for rotational movement with respect to said second helix.

References Cited in the file of this patent

UNITED STATES PATENTS

| | | |
|---|---|---|
| 2,447,212 | Schoeppel | Aug. 17, 1948 |
| 2,506,276 | Olsson | May 2, 1950 |
| 2,612,628 | Horfeck | Sept. 30, 1952 |
| 2,650,352 | Childs | Aug. 25, 1953 |
| 2,708,730 | Alexander et al. | May 17, 1955 |
| 2,769,969 | Comstock | Nov. 6, 1956 |
| 2,836,803 | White et al. | May 27, 1958 |